US007281332B2

(12) United States Patent
Niwa et al.

(10) Patent No.: US 7,281,332 B2
(45) Date of Patent: Oct. 16, 2007

(54) PORTABLE CUTTING TOOL

(75) Inventors: Kenji Niwa, Ibaraki (JP); Teruo Imai, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 133 days.

(21) Appl. No.: 11/154,511

(22) Filed: Jun. 17, 2005

(65) Prior Publication Data

US 2006/0016082 A1 Jan. 26, 2006

(30) Foreign Application Priority Data

Jul. 26, 2004 (JP) .......................... P2004-217995

(51) Int. Cl.
*B27B 9/02* (2006.01)
*B23D 45/16* (2006.01)

(52) U.S. Cl. ............................ 30/376; 30/375; 30/391

(58) Field of Classification Search .................. 30/375, 30/388, 389, 390, 391, 376, 377
See application file for complete search history.

(56) References Cited

U.S. PATENT DOCUMENTS 1,830,579 A * 11/1931 Wappat ...................... 30/391
1,854,510 A * 4/1932 Haas .......................... 30/376
2,657,719 A * 11/1953 Forsberg ...................... 30/376
2,828,784 A * 4/1958 Damijonaitis ................ 30/376
3,706,332 A * 12/1972 George ........................ 30/391
4,982,501 A * 1/1991 Sauerwein et al. ........... 30/376
5,016,510 A * 5/1991 Gardner ..................... 83/471.2
5,121,545 A * 6/1992 Nonaka et al. ............... 30/376
5,848,472 A 12/1998 Eto et al. ...................... 30/375

FOREIGN PATENT DOCUMENTS

JP 8-103901 4/1996
JP 2001-269901 10/2001
JP 2001-287202 10/2001

* cited by examiner

*Primary Examiner*—Hwei-Siu C. Payer
(74) *Attorney, Agent, or Firm*—McGinn IP Law Group, PLLC

(57) ABSTRACT

A portable cutting tool includes a base and a tool main body which are inclinably connected such that a saw blade can be projected from a vicinity of an intersection between a side face of the base and a lower face of the base. A parallelism between the saw blade and the side face of the base is made to be able to be adjusted.

12 Claims, 17 Drawing Sheets

PORTABLE CUTTING TOOL

BACKGROUND OF THE INVENTION

1. Field of the Invention

The present invention relates to a portable cutting tool having a mechanism of adjusting a cutting depth of a saw blade, particularly relates to a portable cutting tool capable of fixing a cutting tool main body at a desired cutting depth position.

A cutting tool according to the invention is suitable for so-to-speak pocket cutting operation in which a workpiece is not cut from an end portion thereof but the workpiece is slit from an upper portion thereof and the workpiece is cut while maintaining a cutting depth constant. Further, the cutting tool is suitable for so-to-speak corner cutting operation for cutting a floor member along a wall side for relining the floor member of a house. A description will be given as follows by taking an example of a portable electric circular saw for convenience of explanation.

2. Description of the Related Art

An example of a portable electric circular saw of a background art is shown in FIG. 25 through FIG. 27.

In the drawings, numeral 1 designates a base, and numeral 2 designates a circular saw main body constituted to be pivotable relative to the base centering on a support shaft 9. The circular saw main body 2 includes a saw blade 3 for cutting a workpiece of a plate member or the like, and a motor (not illustrated) for driving to rotate the saw blade 3. The motor is contained in a motor housing 4 and a rotational drive force thereof is transmitted to a rotating shaft 10 of the saw blade 3 after a speed thereof is reduced by a gear contained in a gear box 7.

A saw cover 5 is attached to a cover of the gear box 7 to cover an upper portion of the saw blade 3, and a protection cover 8 is attached to a lower portion of the saw blade 3 to expose a portion of the saw blade.

As shown in FIG. 27, the base 1 is provided with an inclining mechanism 11 for inclining the main body 2 relative to the base 1. The inclining mechanism includes a support plate 12 connected to the base 1. The support plate 12 is provided with a guide hole 13 in a shape of a circular arc centering on a fulcrum of inclination, not illustrated. The base 1 can be inclined to the main body 2 by sliding a bolt 14 along the guide hole 13.

FIG. 28 shows a state of inclining the base 1 to the main body 2 by 45°. An inclinable angle is set to 45° at a maximum, and the bolt 14 is made to be able to be fixed at a desired position of the guide hole 13 such that the base 1 can be fixed at an arbitrary angular position of 0 through 45°.

On the other hand, as shown in FIG. 29, a link member 20 is connected to the base 1 for adjusting a cutting depth of the saw blade 3 for cutting a workpiece 30. The link member 20 is provided with a guide hole 22 in a shape of a circular arc centering on the support shaft 9, and a bolt 24 (FIG. 30) connecting the guide hole 22 to a lever 21 is slidably provided.

FIG. 30 is a sectional view showing to enlarge a mechanism of connecting the link member 20 and the lever 21. A thick walled portion 5*a* is provided at a portion of the saw cover 5 of the circular saw main body 2 and the thick walled portion 5*a* is provided with a hole portion formed with a female screw at an inner face thereof.

On the other hand, the bolt 24 is fixedly attached to the lever 21 by a screw 23 and the bolt 24 is constituted to screw to the hole portion provided at the thick walled portion 5*a* of the saw cover 5 by way of the guide hole 22 of the link member 20.

As shown in FIG. 29, the circular saw main body 2 is constituted to be able to pivot relative to the base 1 centering on the support shaft 9, and the bolt 24 is slid in the guide hole 22 of the link member 20 in accordance with pivoting movement. Therefore, the cutting depth of the saw blade 3 can freely be adjusted. Further, in order to fix the cutting depth to a desired depth, the bolt 24 is slid along the guide hole 22, the bolt 24 is moved to a desired position of the guide hole 22 and the lever 21 is pivoted. Then, by screwing the male screw and the female screw of the hole portion provided at the thick walled portion 5*a* of the saw cover 5, an interval between a washer 25 and a side face of the link member 20 is fastened and the circular saw main body 2 is fixed to at the position.

An explanation will be given of a method of operation when pocket cutting operation is carried out by using the electric circular saw of the background art as described above, that is, the workpiece 30 is not started to be cut from an end portion 30*a* (FIG. 29) thereof but the workpiece 30 is started to be cut from a middle portion 30*b* thereof as shown in FIG. 29.

In this case, first, the cutting depth of the saw blade 3 is fixed. That is, a position of pivoting the circular saw main body 2 relative to the base 1 is fixed by moving the bolt 24 to a desired position of the guide hole 22 of the link member 20 and turning the lever 21.

Next, in a state of exposing the saw blade by pivoting the protection cover 8 (FIG. 25) and pressing a front end portion 1*a* of the base 1 to fix to the workpiece 30 as shown in FIG. 29, a rear end portion 1*b* of the base 1 is gradually moved down to cut the workpiece 30. By cutting the workpiece 30 until the rear end portion 1*b* of the base 1 is brought into contact with a surface thereof and thereafter moving forward the circular saw main body 2 while bringing a lower face of the base 1 into contact with the surface of the workpiece 30, pocket cutting operation of the workpiece 30 is carried out. Also with regard to edge cutting operation, normally, similar to the pocket cutting operation, the workpiece 30 is not started to be cut from the end portion 30*a* (FIG. 29) but started to be cut from the middle portion 30*b* of the workpiece 30 as shown in FIG. 29.

There has already been known a circular saw having a structure improved for pocket cutting operation and corner cutting operation as disclosed in Japanese Patent No. 2933196, JP-A-2001-269901 and JP-A-2001-287202.

SUMMARY OF THE INVENTION

When the pocket cutting operation is carried out by using the electric circular saw of the background art, in starting cutting operation, the front end portion 1*a* of the base 1 is pressed to the surface of the workpiece 30, the saw blade 3 is aligned to a position of a mark line drawn at the surface and thereafter, the workpiece 30 is cut, however, when the saw blade 3 is positioned while floating the rear end portion 1*b* of the base 1 in a state of rotating the saw blade 3, there poses a problem that the circular saw main body 2 becomes unstable. Further, there also poses a problem that unless the circular saw main body 2 is firmly held, the saw blade 3 is shifted from the position of the mark line and it is difficult to cut the workpiece 30 as desired.

On the other hand, it is also possible to carry out operation of gradually deepening the cutting depth of the saw blade 3 in a state of bringing all the bottom face of the base 1 into contact with the surface of the workpiece 30 from the start in order to stabilize the circular saw main body 2. However, it is necessary to pivot the lever 21 at a cutting position to a desired cutting depth to fix positions of the base 1 and the circular saw main body 2 relative to each other, and it is necessary to carry out the operation while rotating the saw blade 3. Therefore, there poses a problem that it is difficult to accurately set the cutting depth.

Further, for example, when a floor member is cut along a wall side for relining the floor member, it is requested to cut portions of the floor member as proximate to a front wall and a rear wall in a cutting direction as possible. However, the front end portion 1*a* or the rear end portion 1*b* of the base 1 is brought into contact with the wall and the circular saw main body 2 cannot be moved further. Therefore, the floor member cannot be cut from a corner to a corner of a room, and it is necessary to cut remaining portions further by manual operation to thereby pose also a problem that operability is poor.

Further, when the floor member is cut along the wall side, there is carried out an operation of conducting a cutting operation while bringing a side face of the base into sliding contact with a wall, there poses a problem that when a parallelism is not achieved between a side face of the base and a side face of the saw blade at that occasion, the cutting operation along the wall side cannot easily and accurately be carried out.

It is an object of the invention to provide a portable cutting tool resolving the above-described problem of the background art.

Specifically, it is an object of the invention to provide a portable cutting tool capable of being operated in a state of stabilizing a cutting tool main body in so-to-speak pocket cutting operation.

It is another object of the invention to provide a portable cutting tool capable of accurately setting a cut depth in pocket cutting operation.

It is still another object of the invention to provide a portable cutting tool capable of cutting a floor member up to a portion thereof as proximate to a wall as possible in operation of relining the floor member or the like.

It is still another object of the invention to provide a portable cutting tool capable of carrying out corner cutting operation easily and accurately.

Still another object of the invention can be understood further clearly by the following explanation.

In order to achieve the above-described object, an aspect of the invention provides a portable cutting tool including a cutting tool main body and a base, wherein by pivoting the cutting tool main body relative to the base, an amount of a saw blade projected from a lower face of the base can be adjusted, and wherein the base and the tool main body are inclinably connected such that the saw blade can be projected from a vicinity of an intersection between a side face the base and the lower face of the base, and a parallelism between the saw blade and the side face of the base is made to be able to be adjusted.

According to another aspect of the invention, a support shaft constituting a fulcrum of the pivoting includes a screw portion, a portion of the tool main body is formed with a screw portion screwable to the screw portion, the parallelism between a side face of the saw blade and a side face of the base can be adjusted by pivoting the support shaft relative to the tool main body, and an outer periphery of the support shaft is provided with urging means for urging to pivot the base and the tool main body in a direction of separating the base and the tool main body.

According to the invention, in the portable cutting tool including the cutting tool main body and the base, wherein an amount of the saw blade projected from the lower face of the base can be adjusted by pivoting the cutting tool main body relative to the base, the base and the tool main body are inclinably connected such that the saw blade can be projected from the vicinity of the intersection between the side face of the base and the lower face of the base, the parallelism between the saw blade and the side face of the base is made to be able to be adjusted and therefore, corner cutting operation can easily and accurately be carried out.

Further, according to the cutting tool of the invention, the support shaft constituting the fulcrum of the pivoting includes a screw portion, a portion of the tool main body is formed by the screw portion screwable to the above-described screw portion, the parallelism between the side face of the saw blade and the side face of the base is adjustable by pivoting the support shaft relative to the tool main body, the outer periphery of the support shaft is provided with urging means for urging to pivot the base and the tool main body in the direction of separating the base and the tool main body and therefore, operability in pocket cutting operation and corner cutting operation is made to be able to be promoted by a compact constitution and cutting operation for cutting other member while bringing the side face of the base into contact with the other member can easily and accurately be carried out.

DETAILED DESCRIPTION OF THE PREFFERED EMBODIMENTS

First Embodiment

A first embodiment of an electric circular saw according to the invention will be described as follows. Further, constituent elements the same of those of FIG. 25 through FIG. 30 are attached with the same notations and a detailed explanation thereof will be omitted.

As shown in FIG. 1 through FIG. 6, an electric circular saw according to the embodiment is provided with a base 1 mounted on a workpiece 30 in cutting operation and a circular saw main body 2 attached with a saw blade 3 rotated by a motor (not illustrated).

Figure 1:
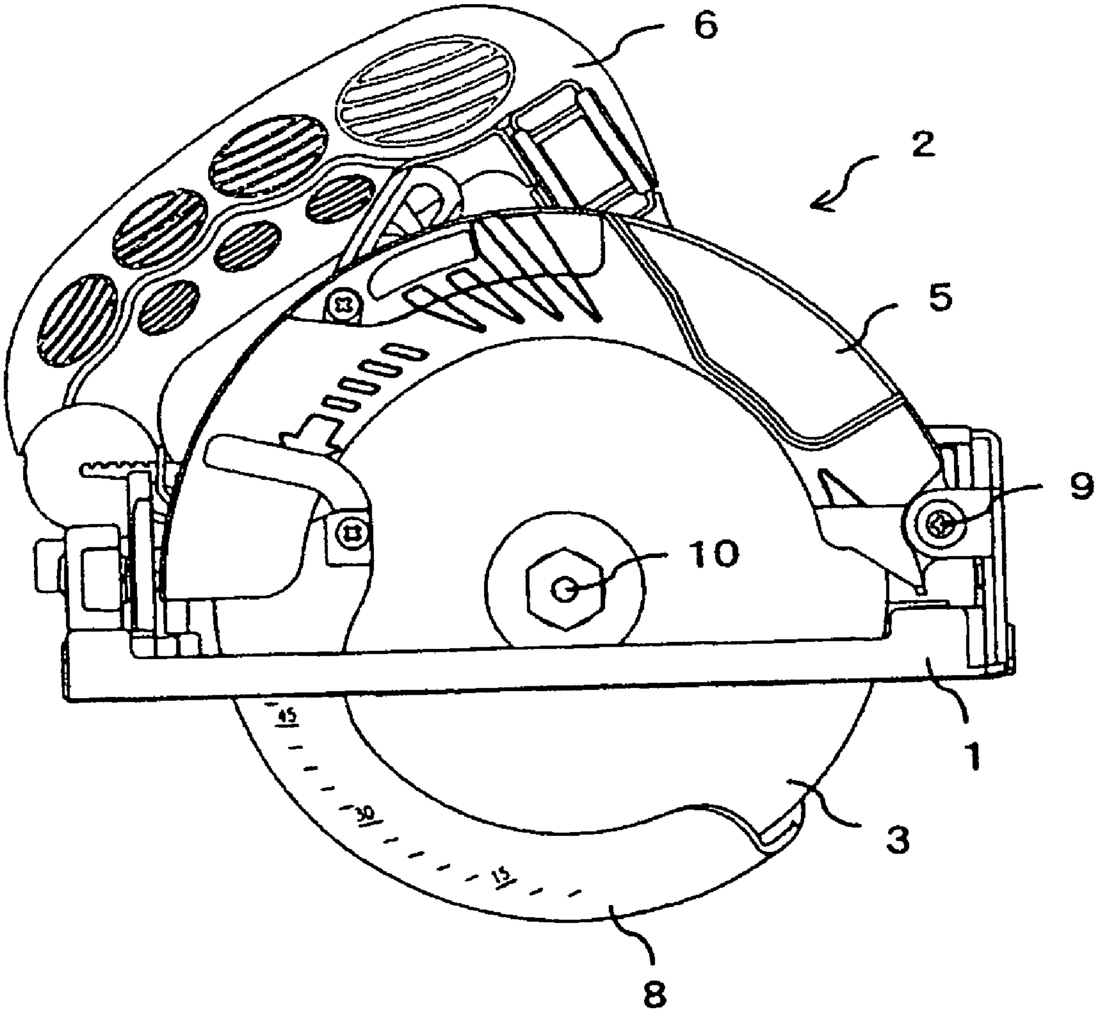
FIG. 1 is a front view showing a portable cutting tool according a first embodiment of to the invention.
Figure 2A:
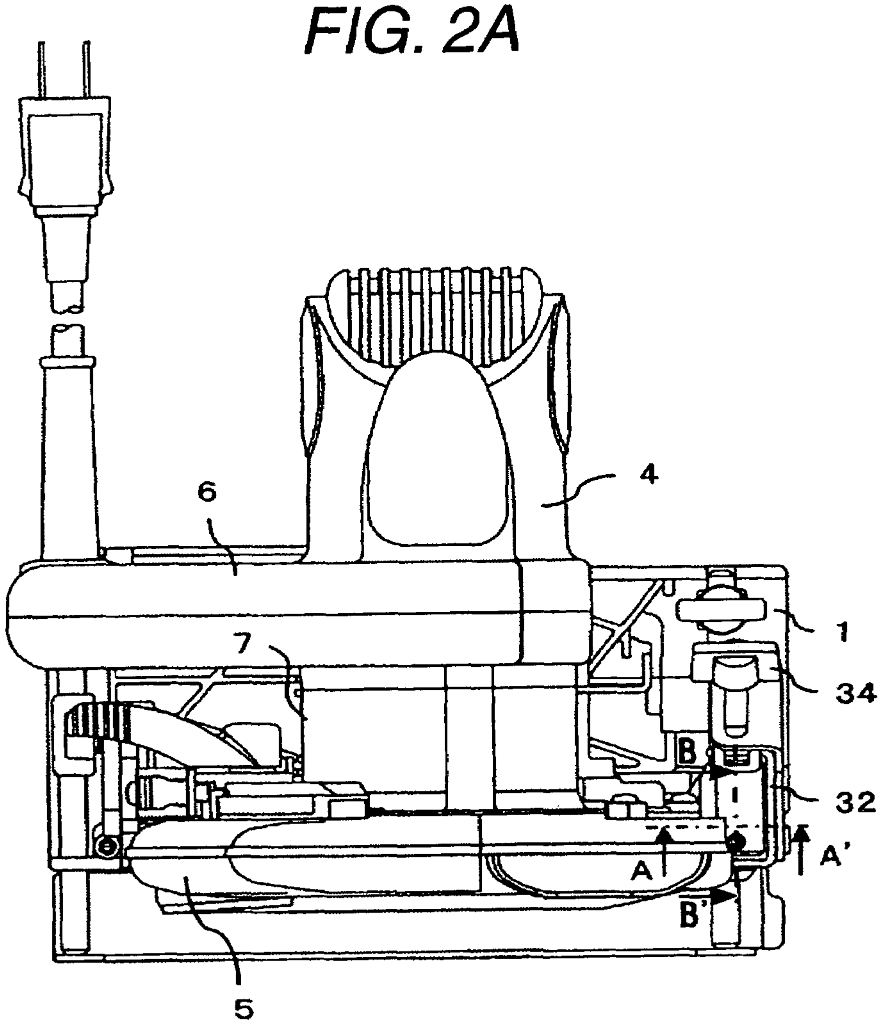
FIG. 2A is a plane view of the tool of FIG. 1.
Figure 2B:
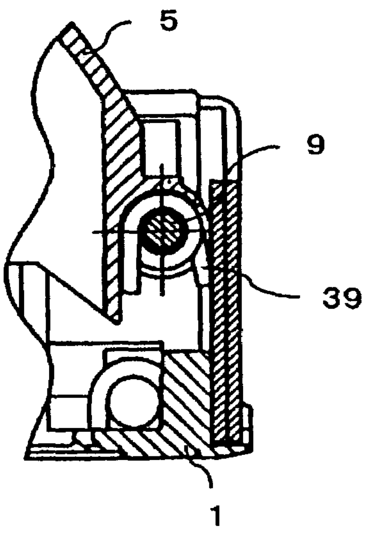
FIG. 2B is a sectional view taken along a line A-A' of FIG. 2A.

The motor is contained in a motor housing 4 (FIG. 2A) and the rotational drive force is transmitted to the saw blade 3 after the speed is reduced by a gear contained in a gear box 7. The circular saw main body 2 is constituted to be pivotable centering on a support shaft 9 relative to the base 1 and FIG. 1 shows a state in which the cut depth of the saw blade 3 projected from the lower face of the base 1 is the largest. Between the support shaft 9 and the saw cover 5 of the circular saw main body 2, a torsional spring 39 is provided as shown in FIG. 2B to urge to pivot the main body 2 relative to the base 1 in a direction of reducing the cut depth of the saw blade projected from the lower face of the base 1.

Figure 2C:
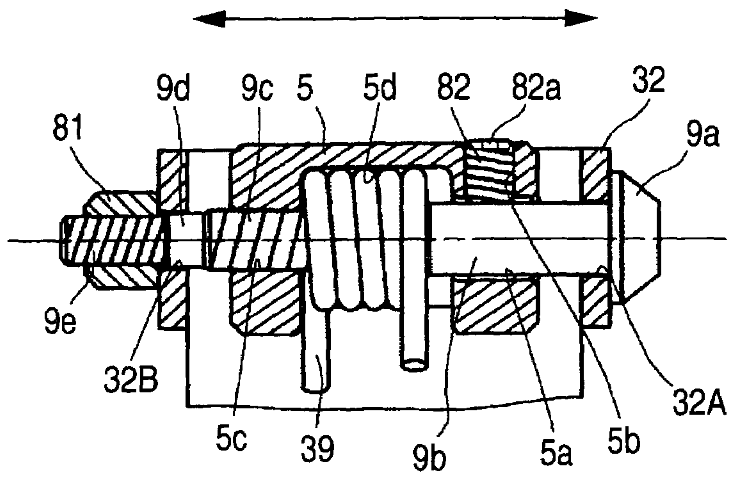
FIG. 2C is a sectional view taken along a line B-B' of FIG. 2A.

As shown in FIG. 2C, the support shaft 9 is pivotably supported by a support member 32 and is constituted by a shape having a head portion 9*a*, a first circular portion 9*b* having a section in a circular shape, a first screw portion 9*c*, a second circular portion 9*d* having a section in a circular shape and a second screw portion 9*e* from a right side of illustration over to a left side and is constituted by a stepped shape respective outer shapes of which are reduced as proceeding to the left side of illustration.

The support member 32 is provided with a hole portion 32A having an inner diameter dimension substantially the same as an outer shape dimension of the first circular portion 9*b*, and a hole portion 32B having an inner diameter dimension substantially the same as an outer shape dimension of the second circular portion 9*d*, and the circular portions 9*b*, 9*d* of the support shaft 9 are pivotably supported in the hole portions 32A, 32B. Further, a draw preventive nut 81 is attached to the second screw portion 9*e* of the support shaft 9 and a position in an axial direction of the support shaft 9 relative to the support member 32 is restricted by the nut 81 and the head portion 9*e*.

Further, the saw cover 5 is provided with a hole portion 5*a* having an inner diameter dimension more or less larger than the outer shape dimension of the first circular portion 9*b*, a screw hole 5*b* formed to be orthogonal to the hole portion 5*a* and a screw hole 5*c* capable of screwing to the first screw portion 9*c*. When the support shaft 9 supported by the support member 32 is pivoted, the saw cover 5 is moved in an illustrated arrow mark direction by screwing the first screw portion 9*c* and the screw portion 5*c*. Further, the saw cover 5 can be moved in a range until the saw cover 5 is brought into contact with the support member 32.

The screw hole 5*b* of the saw cover 5 is screwed with a rotation preventing member 82 for preventing the support shaft 9 and the saw cover 5 from being rotated relative to each other, when a front end of the rotation preventing member 82 is brought into contact with an outer shape portion of the first circular portion 9*b*, rotation of the support shaft 9 and the saw cover 5 relative to each other is prevented and when there is brought about a state in which the rotation preventing member 82 is loosened and the front end is not brought into contact with the outer shape portion of the first circular portion 9*b*, rotation of the support shaft 9 and the saw cover 5 relative to each other is permitted. An end portion of the rotation preventive member 82 is provided with a hexagonal hole 82*a* which can be operated from outside.

In normal time, the circular saw is used by constituting a state of preventing the support shaft 9 and the saw cover 5 from being rotated relative to each other by fastening the rotation preventing member 82, under the state, the support shaft 9 is pivoted relative to the support member 32 along with the saw cover 5 and the cut depth can be adjusted. When the rotation preventing member 82 is loosened and the support shaft 9 is pivoted, as described above, the saw cover 5 is moved in the illustrated arrow mark direction by screwing the first screw portion 9*c* to the screw portion 5*c*, thereby, a parallelism between the side face of the saw blade 3 and the side face of the base 1 can be adjusted.

The torsional spring 39 is arranged such that one end thereof is brought into contact with a portion of the support member and other end thereof is brought into contact with a portion of the saw cover 5 and is constituted such that the torsional spring 39 is disposed at a spring containing space formed between the hole portion 5*a* and the screw portion 5*c* of the saw cover 5, and disposed at an outer periphery of the support shaft 9 to be prevented from being drawn off by the support shaft 9.

Figure 6:
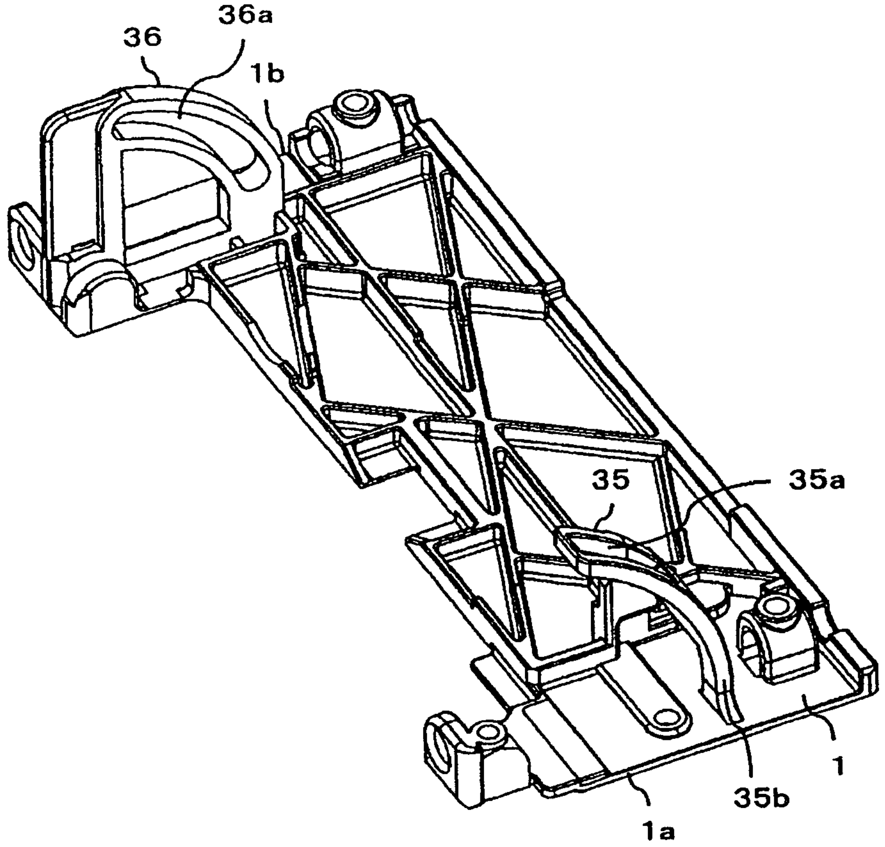
FIG. 6 is a perspective view showing an embodiment of a base of the portable cutting tool.

As shown in FIG. 6, a first guide member 35 in a shape of a circular arc is provided at a location proximate to the front end portion 1*a* (front end portion in a direction of moving forward the circular saw), and a second guide member 36 in a shape of a circular arc is provided at a location proximate to the rear end portion 1*b*. The guide members 35, 36 form an inclining mechanism for inclining the circular saw main body 2 to the upper face of the base 1 as described later.

The first guide member 35 includes a first guide hole 35*a* in a shape of a circular arc penetrated in a radius direction of the circular arc and the second guide member 36 includes a second circular hole 36*a* in a shape of a circular arc penetrated in a direction orthogonal to a radius direction of the circular arc. Although according to the embodiment, directions of penetrating the first and the second guide holes 35*a*, 36*a* differ from each other, also the second guide hole 36*a* may be formed to penetrate in the radius direction of the circular arc similar to the first guide hole 35*a*. By forming the guide holes penetrated in the directions, as described later in details, bolts or thumbscrews for fixing the inclining mechanism can be provided on inner sides of the base of the front end portion 1*a* and the rear end portion 1*b*. That is, the circular saw main body 2 can be constituted without using parts extruded from the front end 1*a* and the rear end 1*b* of the base 1 to outer sides, or can be constituted to restrain to minimize extruding amounts thereof.

Figure 4:
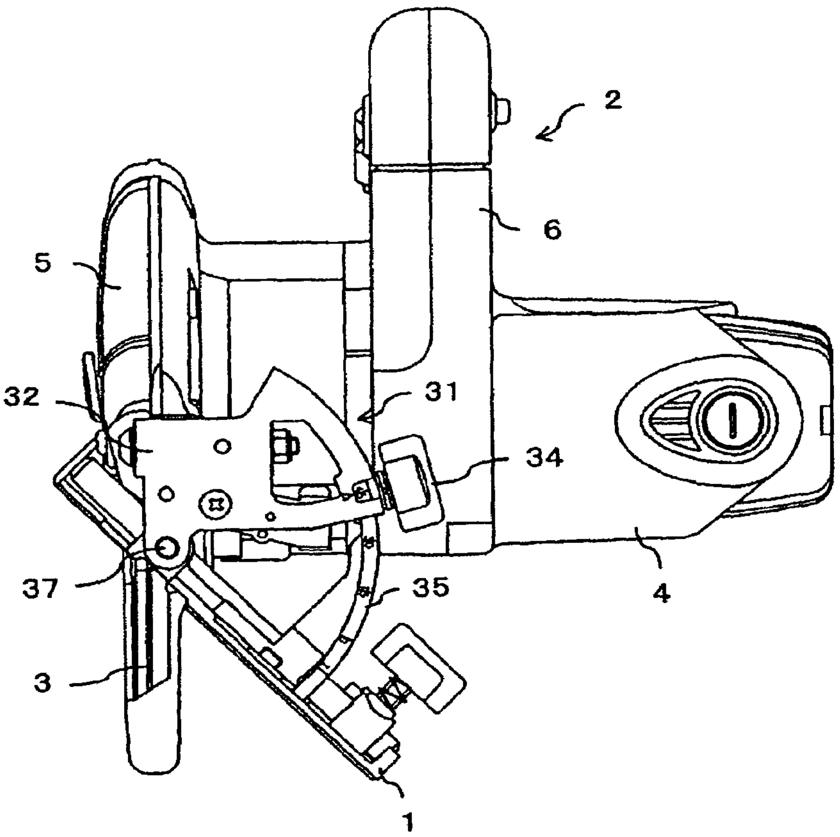
FIG. 4 is a right side view showing an inclined state of the cutting tool according to the first embodiment.

As shown in FIG. 4, the circular saw main body 2 is fixed with the support member 32. The base 1 is pivotably supported centering on a fulcrum 37 of the support member 32. Therefore, by pivoting the base 1 centering on the fulcrum 37, the saw blade 3 can be inclined relative to the upper face of the base 1.

Figure 7:
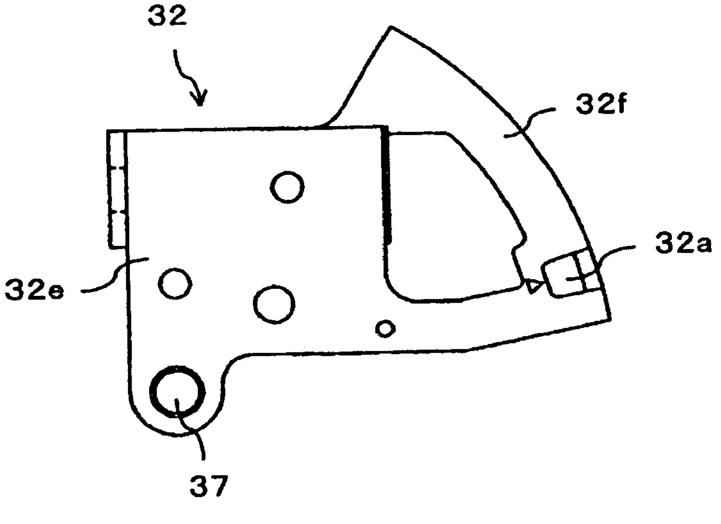
FIG. 7 is a front view showing an embodiment of a support member of the portable cutting tool.
Figure 8:
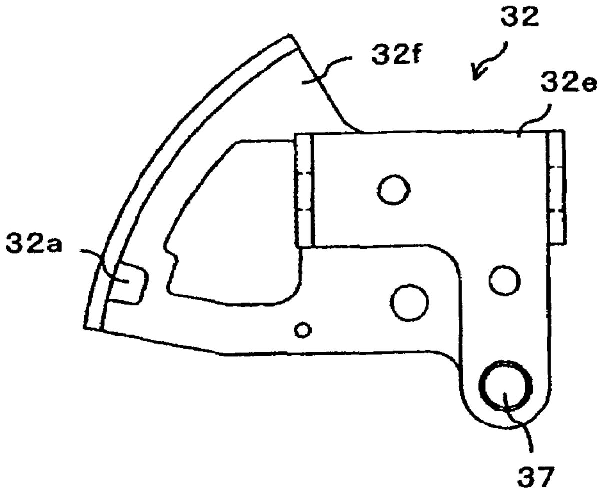
FIG. 8 is a rear view of the support member of FIG. 7.
Figure 9:
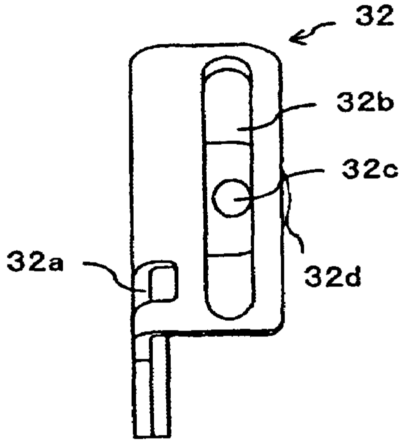
FIG. 9 is a right side view of the support member of FIG. 7.
Figure 10:
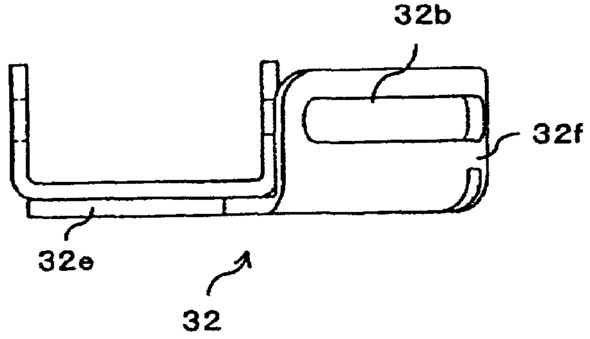
FIG. 10 is a plane view of the support member of FIG. 7.
Figure 11:
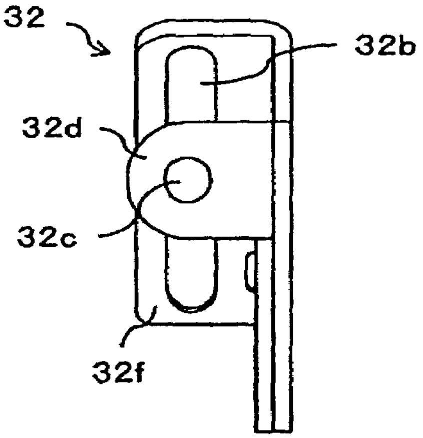
FIG. 11 is a left side view of the support member of FIG. 7.

FIG. 7 shows a front view of the support member 32, FIG. 8 is a rear view thereof, FIG. 9 is a right side view thereof, FIG. 10 shows a plane view, and FIG. 11 shows a left side view.

It is known from FIGS. 7 through 11, the support member 32 includes a member 32*e* having a face extended in a direction orthogonal to the upper face of the base 1, and a member 32*f* connected to the member 32*e*, including a face in a direction orthogonal to the upper face of the base 1 and a face folded to bend in a direction orthogonal thereto and formed in a shape of a circular arc. A guide hole 32*b* (FIG. 9) is provided at the folded to bend face of the circular arc shape member 32*f*, that is, a face sliding on an upper face of the first guide member 35 (FIG. 6) of the base 1. A member 32*d* (FIG. 9) having a through hole 32*c* is provided at a position opposed to the member 32*f* in the circular arc shape at a predetermined interval therebetween. The support member 32 is arranged to interpose the first guide member 35 by the members 32*f* and 32*d*. There is provided a bolt 34 (FIG. 4) penetrating the guide hole 32*b* provided at the member 32*f* in the circular arc shape and the first guide hole 35*a* of the first guide member 35 (FIG. 6) By screwing the bolt 34 and a nut member 38 (FIG. 3) projected into the first guide hole 35*a* to engage therewith rotatably, pivoting positions of the support member 32 and the first guide member 35 relative to each other can be fixed.

Figure 3:
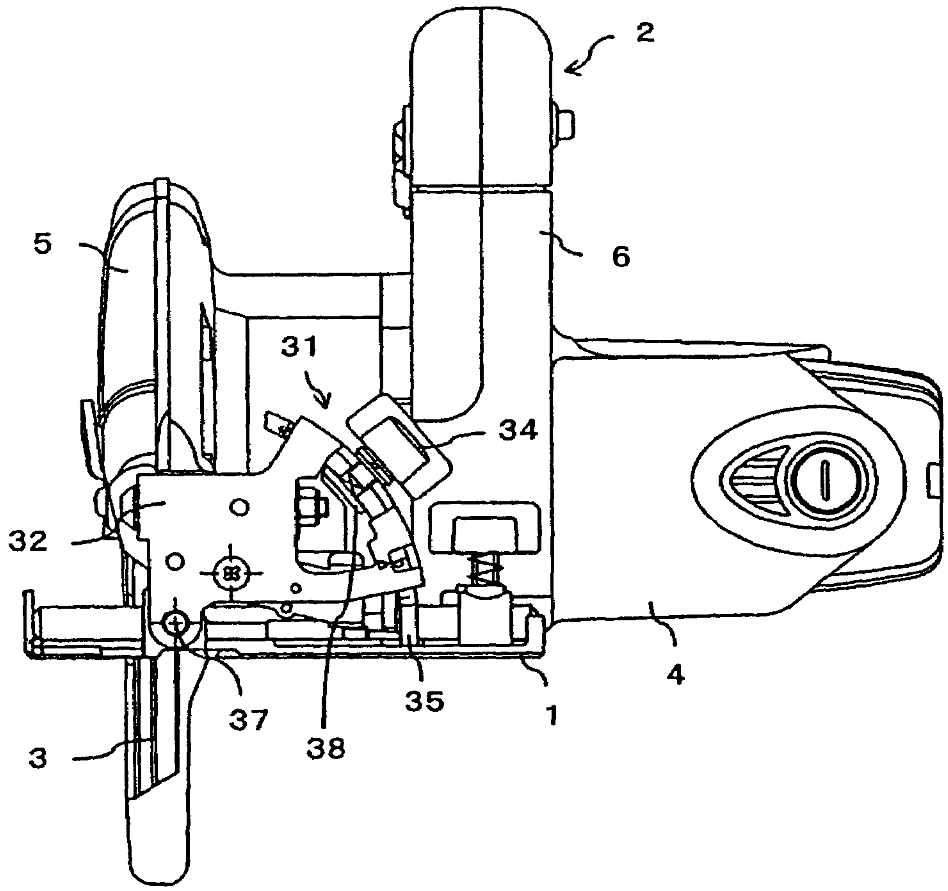
FIG. 3 is a right side view of the tool of FIG. 1.
Figure 5:
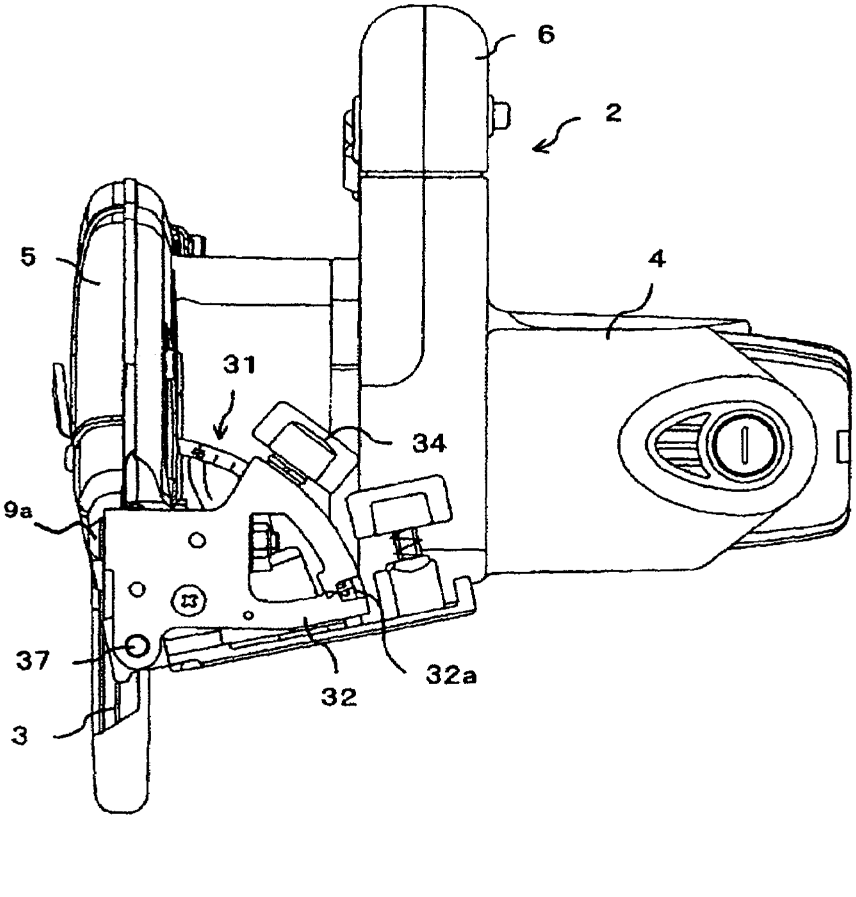
FIG. 5 is a right side view showing an inclined state of the cutting tool showing the first embodiment.

Although not illustrated in FIG. 6, a side face 35*b* is attached with a graduation indicating a pivoting angle and a notched portion 32*a* for reading the angle is provided at the circular arc shape member 32*f* of the support member 32. That is, as shown in FIG. 5, the circular saw is constituted such that an angle of inclination of the saw blade 3 can be read through the notched portion 32*a*. An angular range of the first guide hole 35*a* provided at the first guide member 35 and an angular range of the guide hole 32*b* provided at the circular arc shape member 32*f* of the support member are set to an angular range capable of pivoting the base 1 relative to the circular saw main body 2 in a range of ($\alpha+\beta$). $\alpha$ is normally set to 45° and $\beta$ is set to a range of 10° through 15°. According to the example, $\beta$ is set to $\beta=12°$. When the circular saw is used in a normal mode, the circular saw is used in a range of the angle of inclination of (0 though $\alpha$) and the circular saw is used at $\beta=12°$ when used in a mode of side cutting or the like. FIG. 3 shows a state in which a face of the saw blade 3 is orthogonal to the upper face of the base 1, and FIG. 5 shows a state in which the base 1 is inclined thereto by −12°. When the base 1 is inclined in a direction of $\beta=12°$ as shown in FIG. 5, a tip at a lower portion of the saw blade 3 is inclined in a direction of being extended from a side face of the base 1. Therefore, side cutting can be carried out in a state of bringing the lower face of the base 1 into contact with the workpiece 30.

Further, according to the embodiment, when the inclining angle $\beta$ is set to 12°, the circular saw is constituted to be able to carry out corner cutting operation by projecting the saw blade to a vicinity of a corner portion of the side face of the base 1. When the angle of inclination $\beta$ is smaller than 12°, positions of the corner portion of the side face of the base 1 and the saw blade 3 are shifted from each other.

As shown in FIG. 5, when there is brought about a state of carrying out corner cutting operation, the parallelism between the side face of the saw blade 3 and the side face of the base 1 effects a significant influence on the operation. This is because the cutting operation is frequently carried out while making the side face of the base 1 disposed to be along a wall.

In order to make the parallelism between the side face of the saw blade 3 and the side face of the base 1 easily adjustable in the state shown in FIG. 5, the head portion 9*a* of the support shaft 9 constituting an operating portion for operating to adjust the parallelism is disposed on the left side of illustration and when inclined inversely, the head portion 9*a* is provided at a position remote from the base 1.

Although an explanation has been given of the structure of the inclining mechanism on the side of the front end portion 1*a* of the base 1 as described above, the inclining mechanism on the side of the rear end portion 1*b* can be constituted quite similarly.

Further, when the parallelism adjusting mechanism is constructed by a constitution of being provided also on the side of the front end portion 1*b* of the base 1, it can be adjusted from what position the saw blade 3 is projected to an intersection of the side face of the base 1 and a lower face of the base 1 and operability can further be promoted.

Next, a mechanism of adjusting a cut depth according to the embodiment will be explained.

As shown in FIG. 1, when the circular saw main body 2 is pivoted centering on the support shaft 9, an amount of projecting the saw blade 3 from the lower face of the base 1 is changed and therefore, the cut depth can be adjusted.

Figure 12:
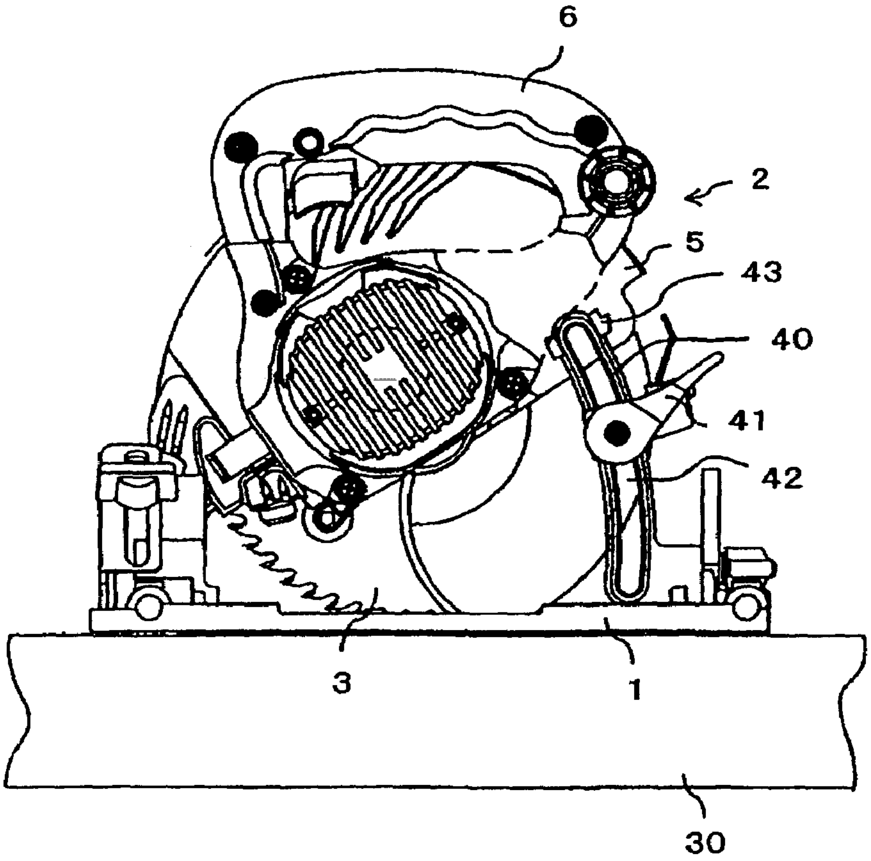
FIG. 12 is an explanatory view showing an operational state of the first embodiment of the portable cutting tool.

As shown in FIG. 12, the base 1 is fixed with a link member 40 in a shape of a circular arc extended in a direction of pivoting the cutting tool main body 2 and a member 43 (referred to as hook member according to the embodiment) attached to the saw cover 5 is slid along the link member 40 to be able to able to pivot in accordance with pivoting movement of the circular saw main body 2.

According to the invention, there is provided a stopper mechanism in which when the circular saw main body 2 is pivoted until the cut depth of the saw blade 3 becomes a previously set depth, the position of pivoting the circular saw main body 2 relative to the base 1 is fixed at the position of the cut depth.

Figure 13:
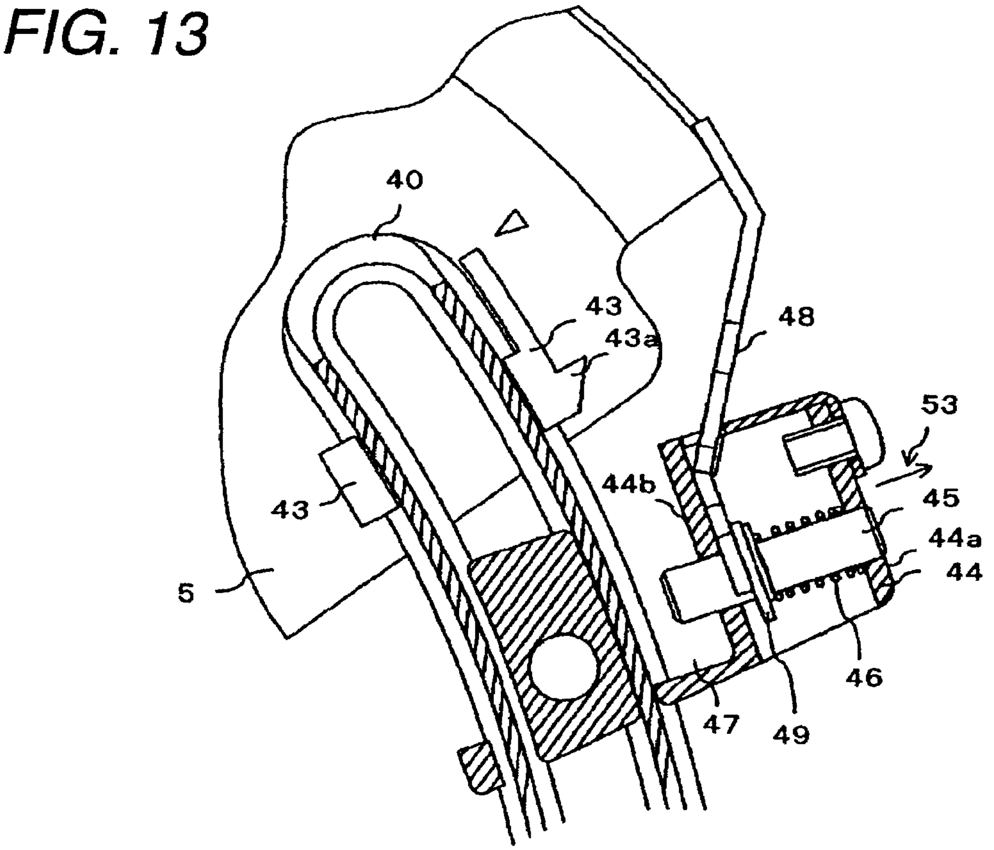
FIG. 13 is a view enlarging an essential portion of FIG. 12.

FIG. 13 shows a stopper mechanism 53 including a stopper case 44, a stopper 45, a spring 46, a lever 48 and the like. Although the stopper 45 is pressed to a side of a lower stopper case 44*b* by the spring 46, the stopper 45 can be moved in a direction of an arrow mark through a hole of an upper stopper case 44*a*. The stopper mechanism 53 can be fixed at an arbitrary position of the link member 40 as mentioned later.

On the other hand, the hook member 43 fixed to the saw cover 5 of the circular saw main body 2 is provided to be able to move along an outer periphery of the link member 40 and a portion thereof includes a claw portion 43*a* to be engaged with a recess portion 47 of the stopper mechanism 53.

Figure 14:
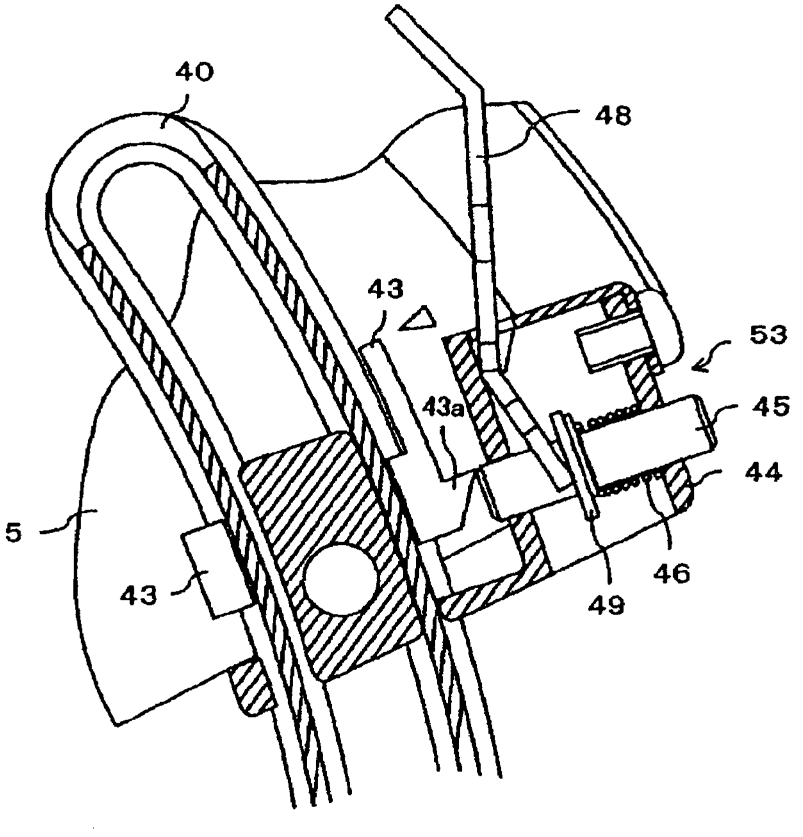
FIG. 14 is a view enlarging an essential portion showing a state in cutting of the first embodiment of the portable cutting tool.

When the saw cover 5 is gradually moved down as shown in FIG. 14, a bottom portion of the stopper member 45 of the stopper mechanism 53 is pushed up by the claw portion 43*a*. When the saw cover 5 is moved down further to a position of FIG. 15, the claw portion 43*a* is brought into the recess portion 47 and therefore, the stopper member 45 is moved down by the spring 46 and the claw portion 43*a* is engaged with the stopper mechanism 53. That is, pivoting movement of the hook member 43 in a direction of an upper side as illustrated is restricted by the stopper member 45, pivoting movement thereof in a direction of a lower side as illustrated is restricted by a lower wall face of the stopper case 44, and a position of pivoting the circular saw main body 2 relative to the base 1 is fixed and therefore, the cut depth of the saw blade 3 can be maintained constant.

Figure 15:
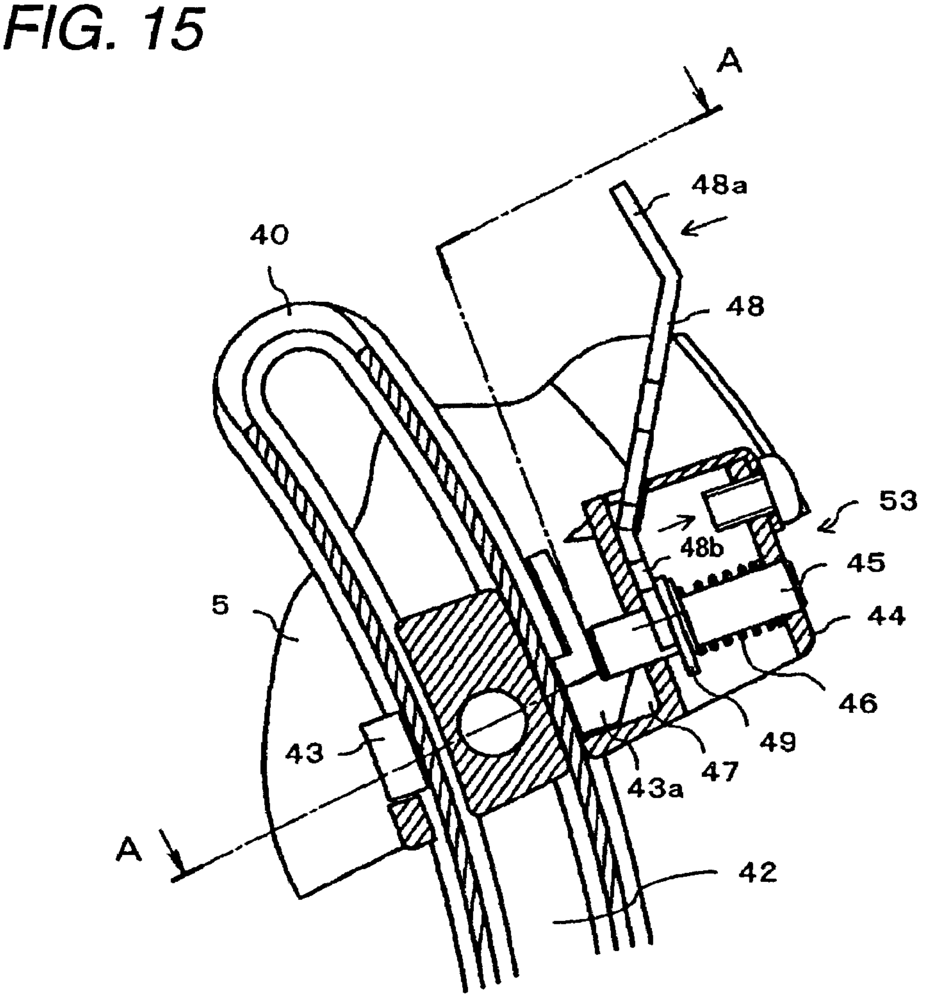
FIG. 15 is a view enlarging an essential portion showing the state in cutting of the first embodiment of the portable cutting tool.

When one end 48*a* of the lever 48 of FIG. 15 is pressed in an arrow mark direction, other end 48*b* thereof is moved in a reverse direction, a stopper plate 49 is pushed up and therefore, also the stopper member 45 can be pushed up. Therefore, engagement of the bottom portion of the stopper member 45 and the claw portion 43*a* can freely be disengaged.

Figure 16:
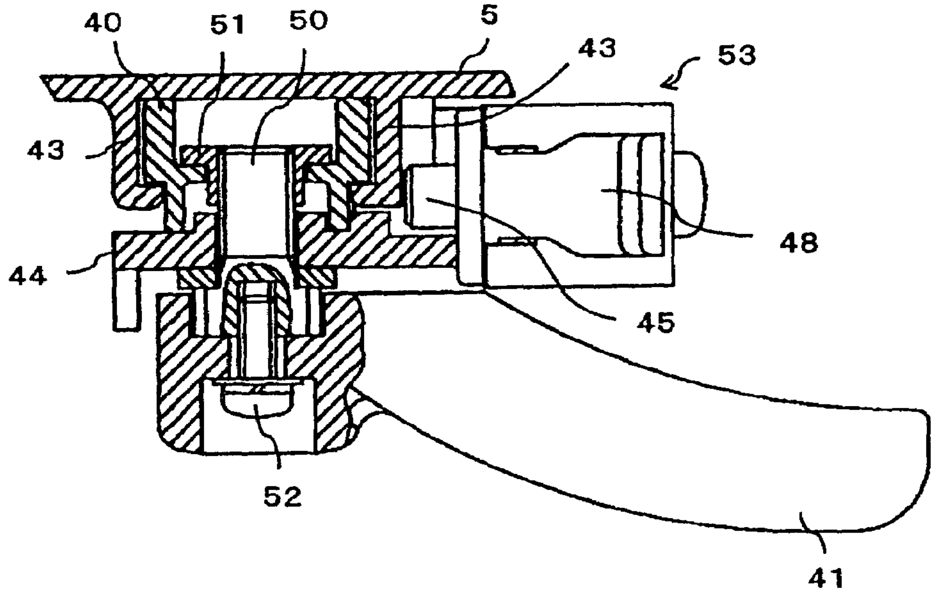
FIG. 16 is a sectional view taken along a line A-A of FIG. 15.
Figure 17:
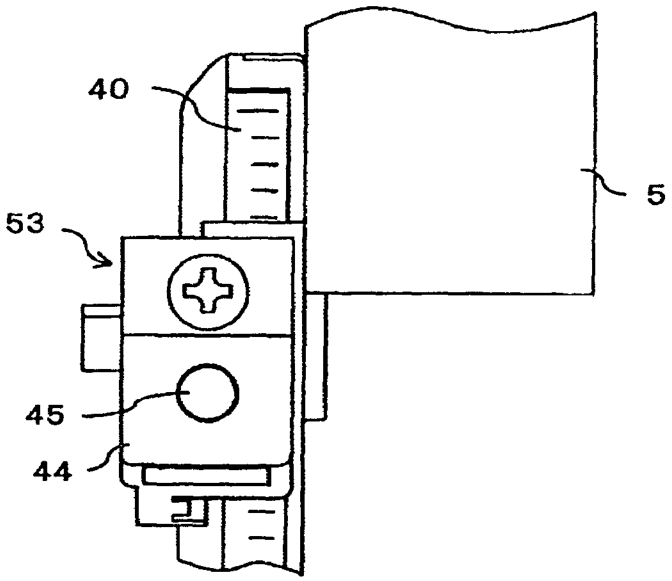
FIG. 17 is a left side view enlarging an essential portion of FIG. 15.

The above-described stopper mechanism 53 is constituted to be able to be fixed at an arbitrary position of the link member 40. FIGS. 16, 17 show a structure thereof, FIG. 16 is a sectional view taken along a line A-A of FIG. 15 and FIG. 17 is a view enlarging an essential portion of FIG. 15. The hook member 43 connected to the saw cover 5 is slid on an outer periphery of the link 40, and an inner side of the link 40 is provided with a member 51 having a screw hole projected to a guide hole 42 and engaged with the link 40 pivotably. A bolt 50 screwed with the screw hole is provided to penetrate a hole of the stopper case 44 and a lever 41 of the stopper mechanism 53 and the bolt 50 is connected by a screw 52.

When the lever 41 is pivoted, also the bolt 50 is pivoted, and an interval between the member 51 screwed with the bolt 50 and the link 40 are fastened to fix. When the lever 41 is pivoted in a reverse direction, the interval between the member 51 and the link 40 is loosened and the stopper mechanism 53 can be slid along the link 40. Further, as shown in FIG. 17, an outer face of the link 40 is attached with a graduation representing the cut depth and therefore, by sliding the stopper mechanism 53 along the link 40 and fixing the stopper mechanism 53 at a desired position, the cut depth accordance with a graduation can be set.

Next, an explanation will be given of a method of operation when pocket cutting operation is carried out by using the circular saw according to the first embodiment.

First, as shown in FIG. 5, the angle of inclination of the inclining mechanism 31 is set to −12°. When the angle of inclination is set in this way, contrary to normal inclination of the circular saw main body 2, the lower face of the tip of the saw blade 3 is inclined to a direction of extruding from the side face of the base 1 and therefore, the angle of inclination is suitable for side cutting. Further, when the angle of inclination is inclined in a minus direction in the embodiment, in order to prevent the motor housing 4 from being brought into contact with the upper face of the base 1, it is necessary to more or less reduce the cut depth.

Figure 29:
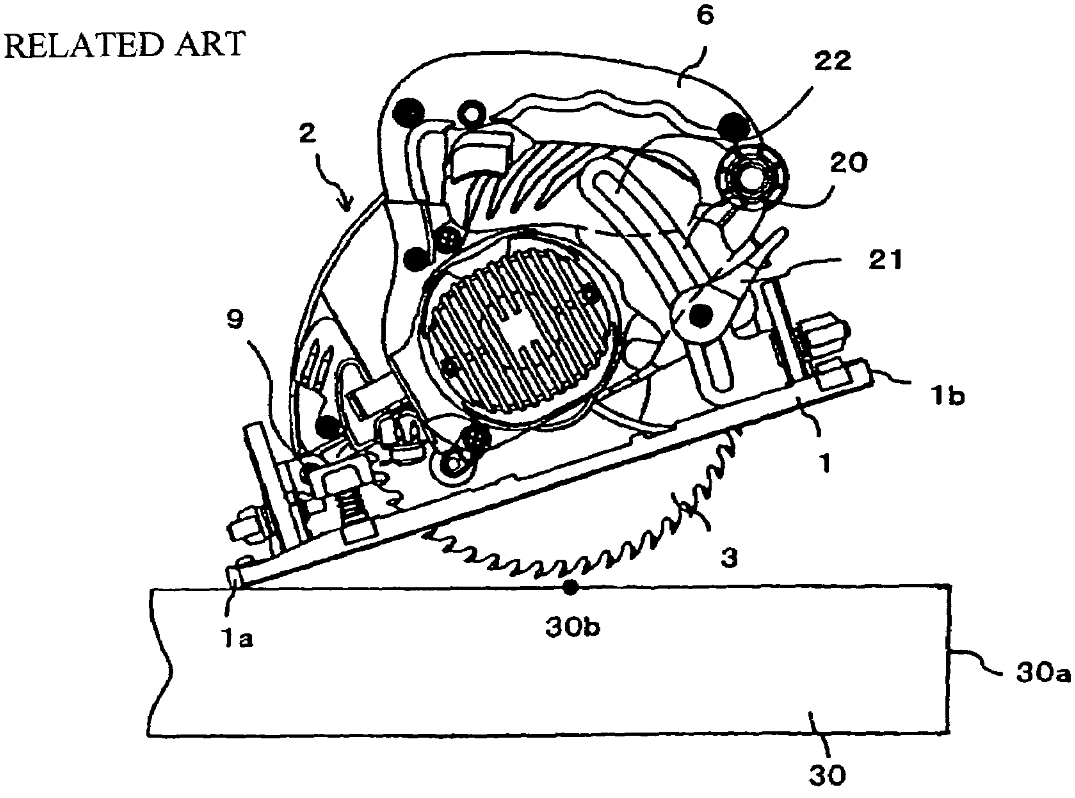
FIG. 29 RELATED ART
FIG. 29 is a rear view showing a cutting operational state of the cutting tool of the background art.
Figure 30:
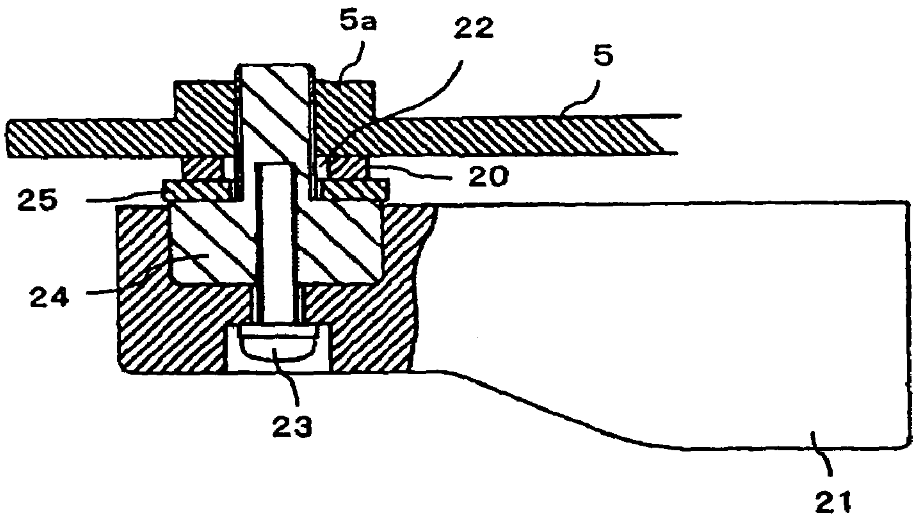
FIG. 30 RELATED ART
FIG. 30 is a sectional view enlarging an essential portion of FIG. 29.

Next, the main body 2 is pivoted relative to the base 1 to constitute a desired cut depth in a state of engaging the claw portion 43*a* of the hook 43 with the stopper mechanism 53 as shown in FIG. 15. Thereafter, when engagement between the hook member 43 and the stopper member 53 is released by pushing up the stopper plate 49, the main body 2 is pivoted in a direction of reducing the cut depth by operation of the spring. After setting in this way, the circular saw main body 2 is mounted on the workpiece 30 such that the lower face of the base 1 is brought into contact with the workpiece 30. Therefore, the circular saw main body 2 can be placed on the workpiece 30 in a state of being more stable than in the method of placing the base front end portion 1*a* to the workpiece 30 as shown in FIG. 29.

When the cut depth is gradually deepened under the state, also the hook member 34 fixed to the saw cover 5 is gradually pushed down. When the claw portion 43*a* of the hook member 43 is moved down to the position of FIG. 15 and the claw portion 43*a* and the stopper mechanism 53 are engaged, the cut depth is fixed at the set depth. Therefore, when the workpiece 30 is cut under the state, corner cutting operation can be carried out by the constant cut depth.

Second Embodiment

Figure 18:
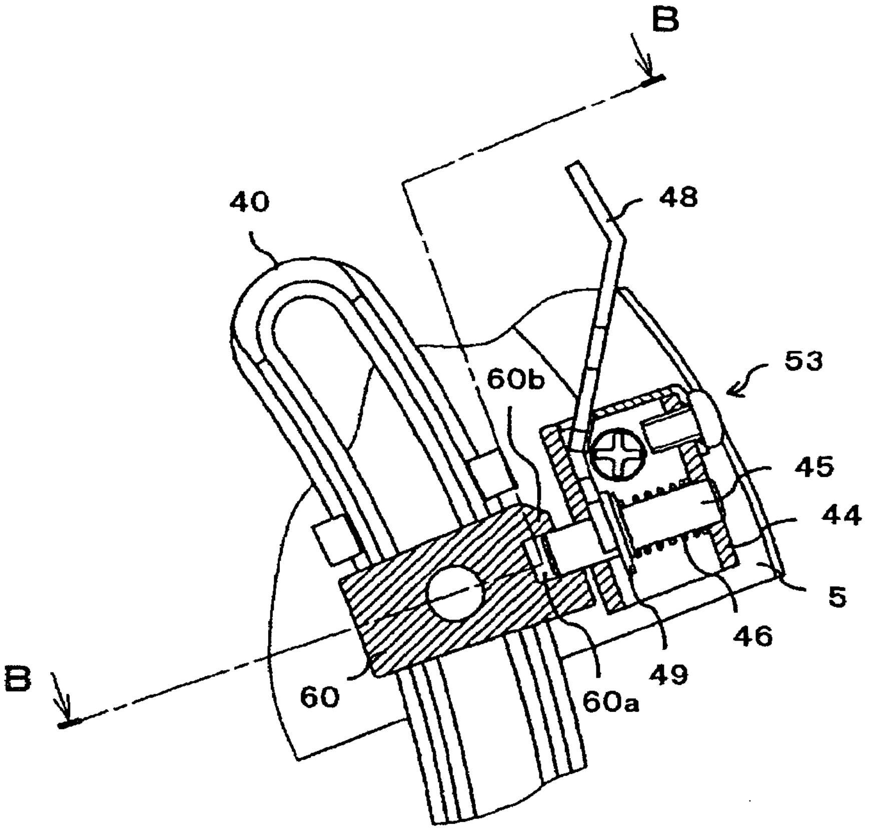
FIG. 18 is a view enlarging an essential portion showing a portable cutting tool according to a second embodiment of the invention.
Figure 19:
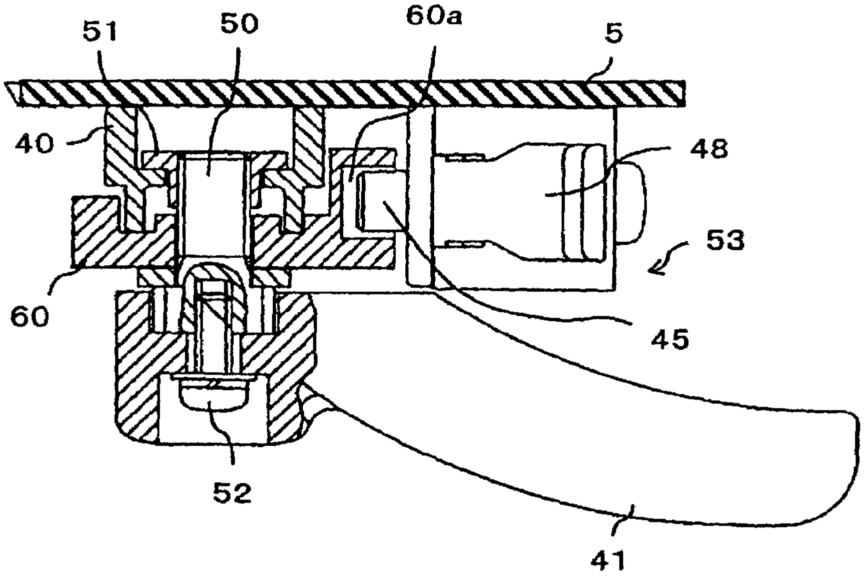
FIG. 19 is a sectional view taken along a line B-B of FIG. 18.

FIG. 18 and FIG. 19 show a second embodiment of a stopper mechanism of an electric circular saw according to the invention. Constituent elements in the drawings the same as those of FIGS. 13 through 17 are attached with the same notations and an explanation thereof will be omitted.

Although according to the first embodiment, the hook member 43 is fixed to the saw cover 5 and the stopper mechanism 53 is made to be able to fix to a desired position of the link member 40, according to the second embodiment, contrary thereto, a hook member 60 is made to be able to fix to a desired position of the link member 40 and the stopper mechanism 53 is fixed to the saw cover 5.

As shown in FIG. 18, a recess portion 60*a* is provided to the hook member 60 fixed to a desired position of the link member 40, when the saw cover 5 is moved down, a bottom portion of the stopper member 45 is engaged with the recess portion 60*a* and the cut depth is fixed at the position.

FIG. 19 is a sectional view taken along a line B-B and the bolt 50 and the member 51 screwed the bolt 50 are connected to the hook member 60. Further, the bolt 50 is connected to the lever 41 by the screw 52. Therefore, when the member 51 and the link 40 are fastened by screwing with bolt 50 and the member 51 by pivoting the lever 41, the hook member 60 can be fixed and when the member 51 and the link 40 are loosened, the hook member 60 can be slid along the link 40. Therefore, similar to the first embodiment, the cut depth of the circular saw main body 2 can be deepened gradually from a minimum position and can be fixed to a previously set desired position and pocket cutting operation can easily be carried out by the constant cut depth.

Third Embodiment

Figure 20:
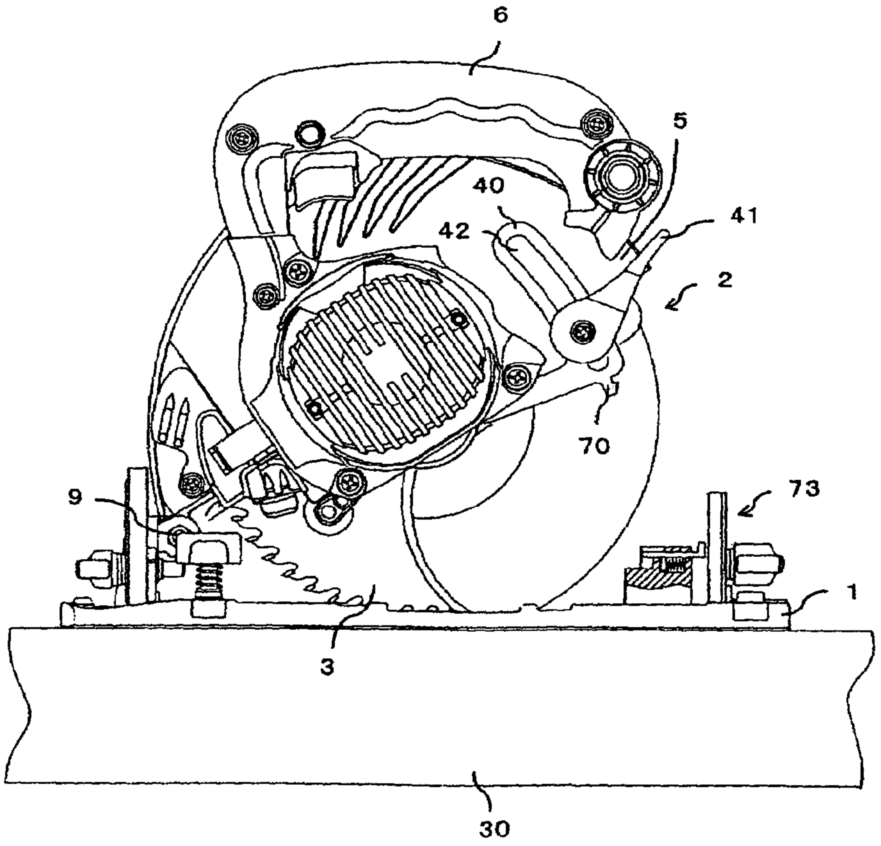
FIG. 20 is a rear view showing a portable cutting tool according a third embodiment of to the invention.

Although according to both of the above-described embodiments 1 and 2, examples of fixing the link 40 to the base 1 are shown, according to a third embodiment, as shown in FIG. 20, the link 40 is made to be pivoted relative to the saw cover 5 and can be fixed to a desired position of the saw cover 5 by the lever 41. The third embodiment is constituted such that a bolt (not illustrated) fixed to the lever 41 and the saw cover 5 is made to be able to slide along the guide hole 42 of the link 40 and by pivoting the lever 41, a height position of the link 40 can be fixed to a desired position by pivoting the lever 41.

Figure 21:
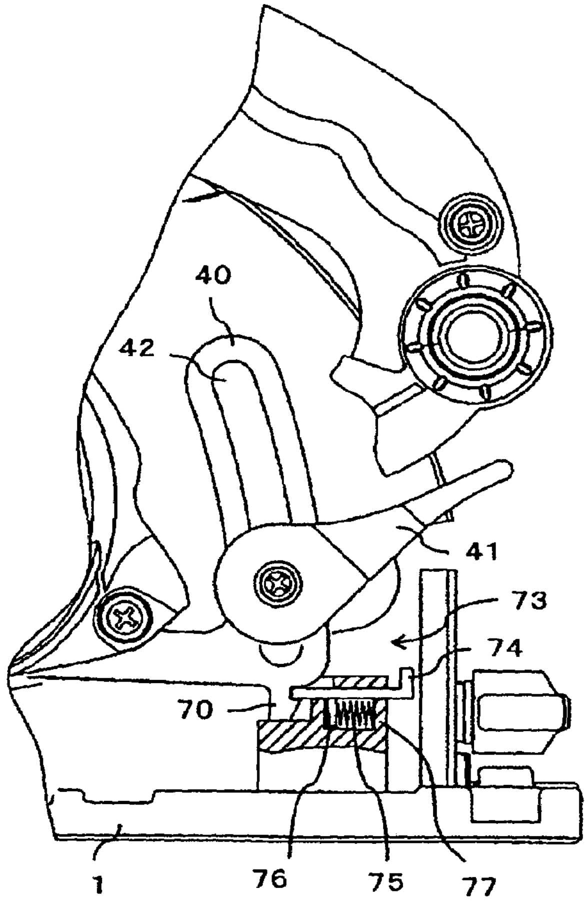
FIG. 21 is a view enlarging an essential portion showing an operational state of the cutting tool of FIG. 20.

Further, as shown in FIG. 20, the third embodiment is constituted such that a claw portion 70 is provided at a lower end of the link 40 and when the circular saw main body 2 is pivoted by constituting a fulcrum by the support shaft 9, the claw portion 70 is engaged with a stopper mechanism 73 fixed to the base 1. As shown in FIG. 21, the stopper mechanism 73 includes a stopper member 74, a spring 75, a stopper plate 76, and a stopper case 77. When the cut depth of the circular saw main body 2 is gradually deepened and the claw 70 provided at the lower end of the link member 40 is moved down, the stopper member 74 is moved in a right direction of the drawing and when the claw portion 70 is moved down further, the stopper member 74 is moved in a left direction of the drawing by the spring 75 to engage with the claw portion 70. Therefore, the cut depth position of the circular saw main body 2 is fixed at the position. As described above, the height position of the link member 40 relative to the circular saw main body 2 can be adjusted by the lever 41 and therefore, also according to the embodiment, the cut depth of the saw blade 3 relative to the workpiece 30 can be deepened gradually from the minimum value and can be fixed at the previously set predetermined cut depth position. Therefore, stable pocket cutting operation can be carried out.

Fourth Embodiment

Figure 22:
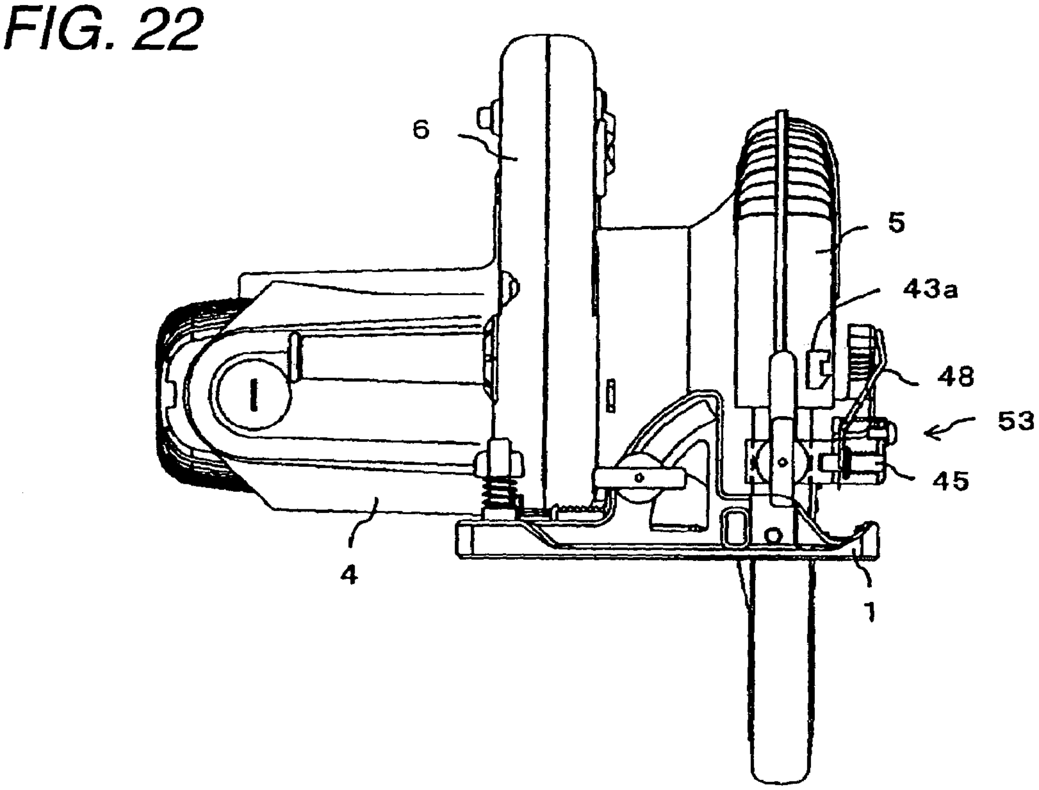
FIG. 22 is a left side view showing a portable cutting tool according to a fourth embodiment of the invention.
Figure 23:
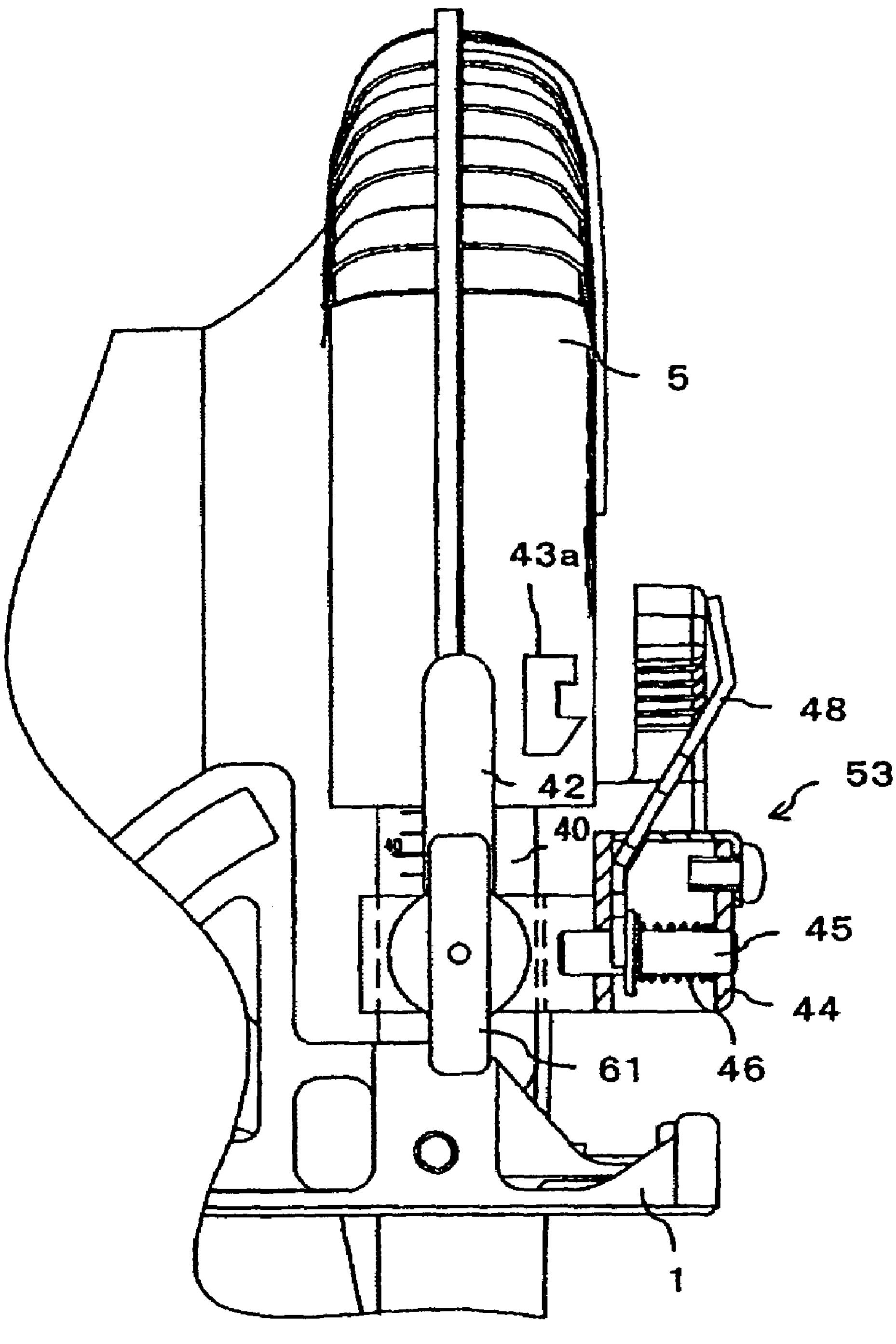
FIG. 23 is a view enlarging an essential portion of FIG. 22.

Although the first embodiment is constituted such that the hook member 43 is slid along the link member 40, according to a fourth embodiment, as shown in FIGS. 22, 23, the link member 40 is provided to be able to move to an inner side of the saw cover 5 and the claw portion 43*a* is fixed to an outer side of the saw cover 5. The fourth embodiment 4 is constituted such that the link member 40 is fixed to the base 1, the stopper mechanism 53 is provided to be able to slide along the link member 40 and can be fixed at an arbitrary position of the link member 40 by a thumbscrew 61.

Figure 24:
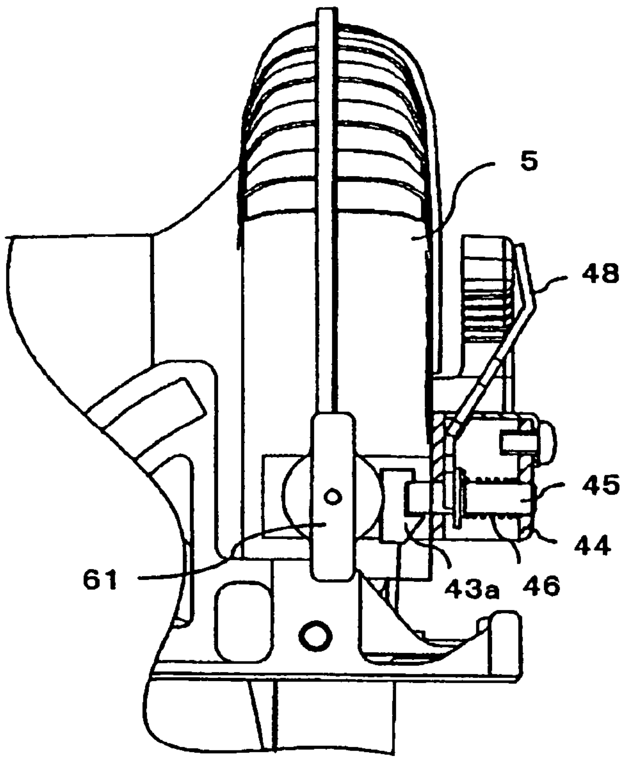
FIG. 24 is a view enlarging an essential portion showing an operational state of the cutting tool of FIG. 22.
Figure 25:
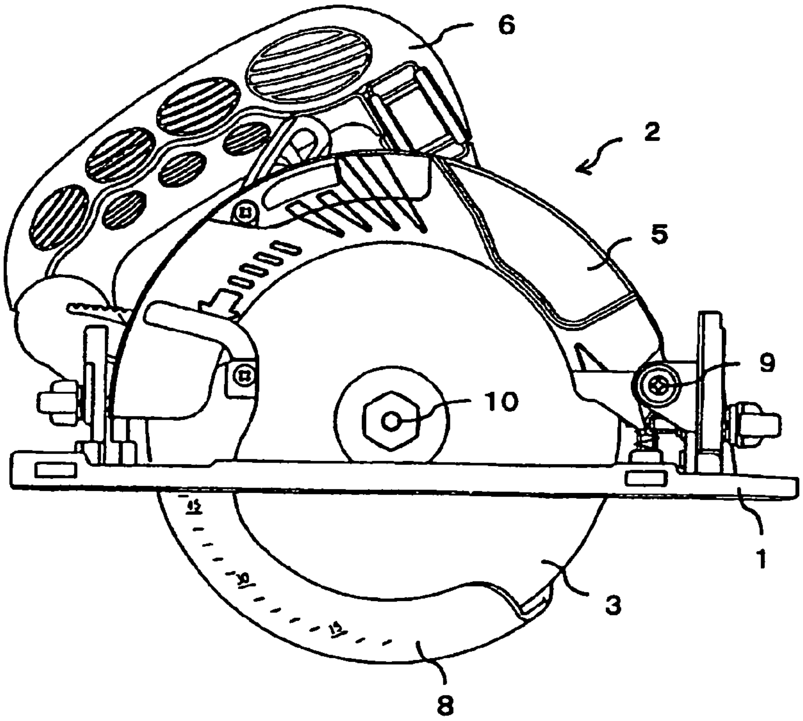
FIG. 25 RELATED ART
FIG. 25 is a front view of a cutting tool of a background art.
Figure 26:
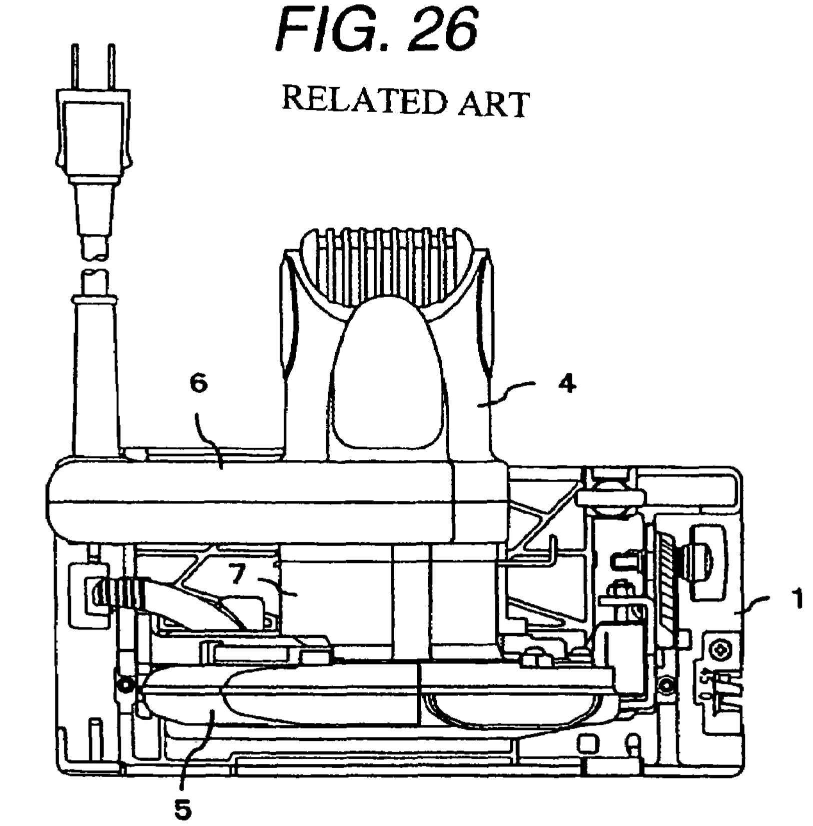
FIG. 26 RELATED ART
FIG. 26 is a plane view of the cutting tool of the background art.
Figure 27:
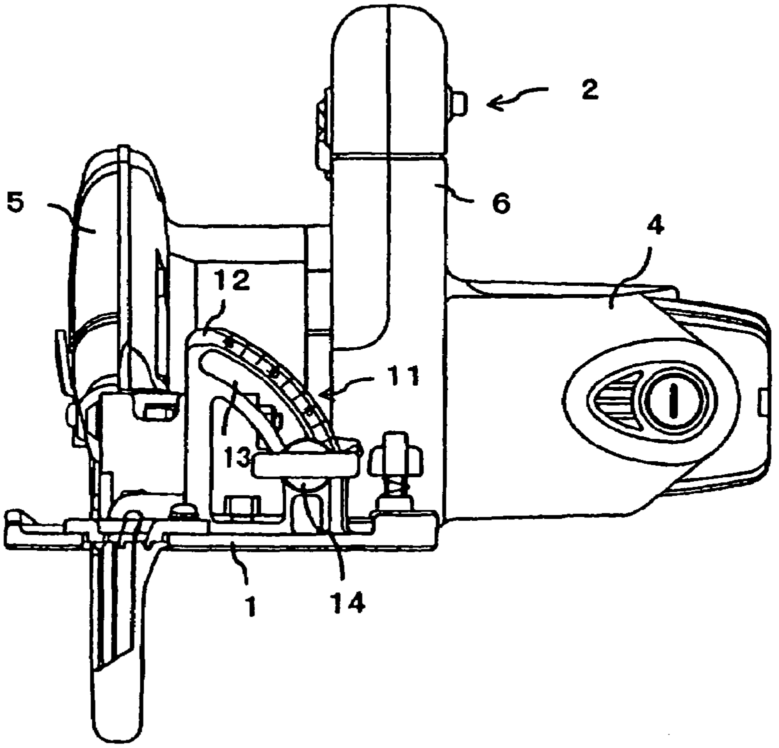
FIG. 27 RELATED ART
FIG. 27 is a right side view of the cutting tool of the background art.
Figure 28:
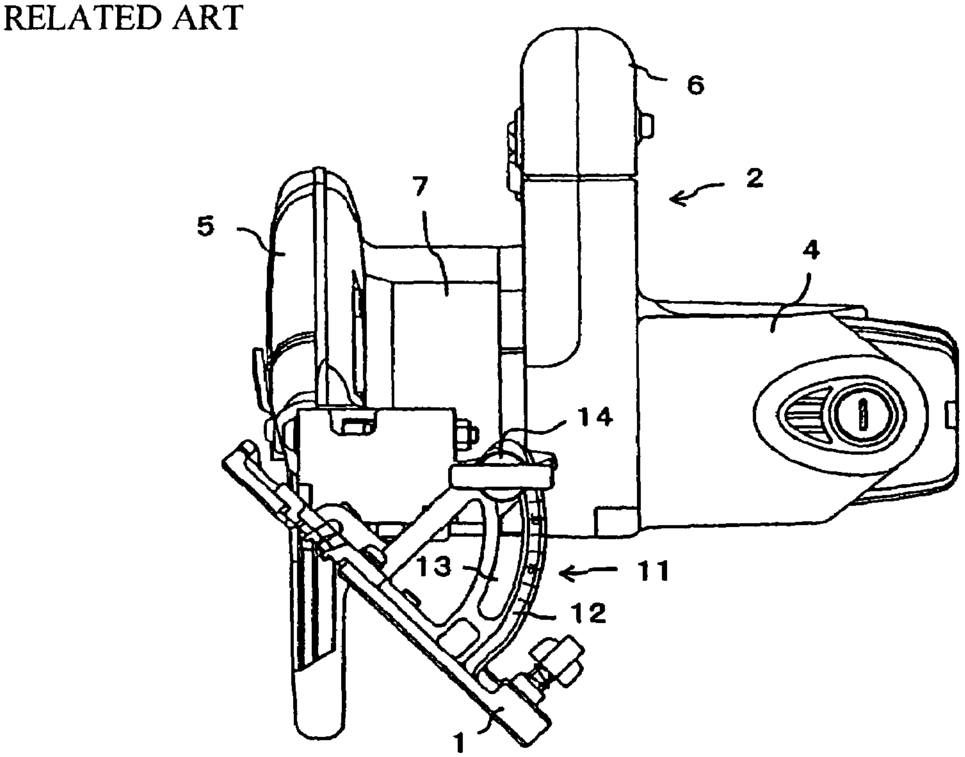
FIG. 28 RELATED ART
FIG. 28 is a right side view showing an inclined state of the cutting tool of the background art.

FIG. 23 shows a state in which the claw portion 43*a* fixed to the saw cover 5 is not engaged with the stopper mechanism 53. When the cut depth of the circular saw main body 2 is gradually deepened from the state, the position of the claw portion 43*a* fixed to the saw cover 5 is gradually moved down. Further, the bottom portion of the stopper member 45 of the stopper mechanism 53 fixed to the link 40 is pushed up and therefore, the movable member 45 is moved in a right direction of the drawing. Further,when the claw portion 43*a* is moved down, as shown in FIG. 24, the movable member 45 is moved again to the left side to engage with the claw portion 43*a* and the cut depth of the circular saw main body 2 is fixed at the position. That is, also in the structure of the fourth embodiment, when the cut depth of the circular saw main body 2 is gradually increased, the cut depth can be fixed at the position of the previously set predetermined depth.

Figure 31:
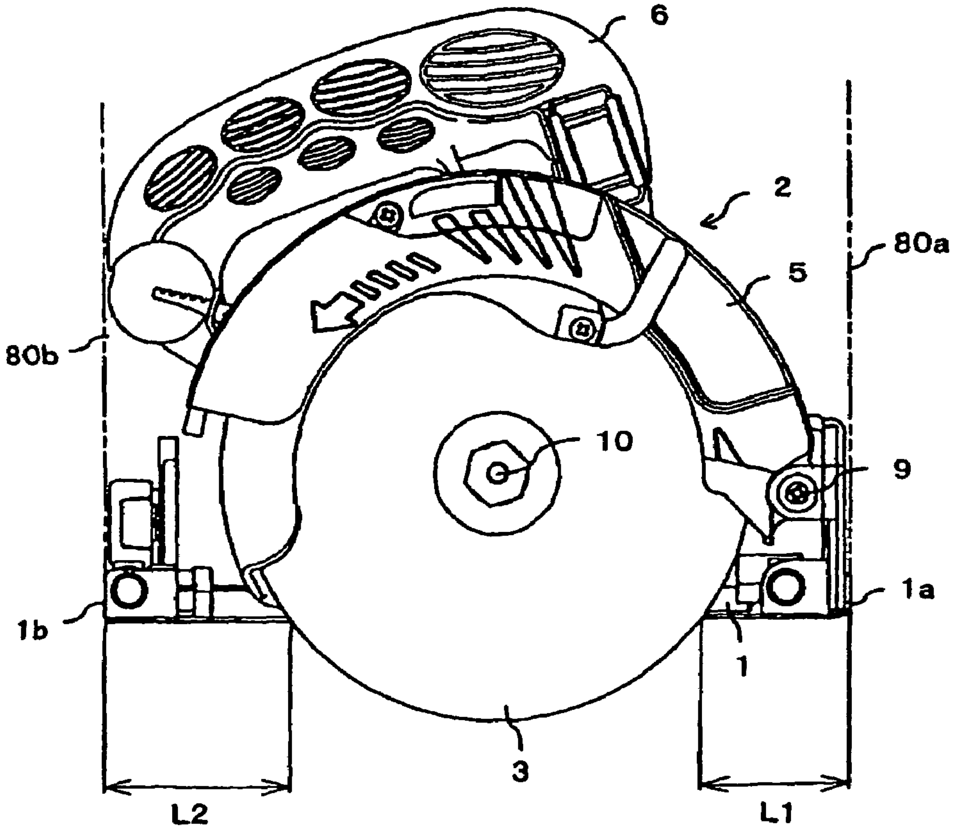
FIG. 31 shows a state in maximal cutting in side cutting of the portable cutting tool according to the invention.

Although an explanation has been given of embodiments of the stopper mechanism of the electric circular saw according to the invention as described above, next, a constitution of a total of the circular saw will be explained in reference to FIG. 31. FIG. 31 is a front view showing a state in maximum cutting when side cutting is made to be able to carry out by using the circular saw of the invention. That is, the angle of inclination of the saw blade 5 relative to the base 1 can be made to be −12° by the inclining mechanism 31 shown in FIG. 5 and FIG. 31 shows a state of maximizing the depth of the saw blade 3 projected from the lower face of the base 1 by pushing down a handle portion 6 by constituting a fulcrum by the support shaft 9 of FIG. 1 under the state. Under the state, the handle portion 6 is disposed on an inner side of a face 80*b* vertical from the rear end portion 1*b* of the base 1 of the base 1. Further, under the same state, the bolt 34 and the thumbscrew of the inclining mechanism 31 shown in FIG. 5 are disposed on an inner side of a face 80*a* vertical from the front end portion of the base 1. That is, all the parts of the circular saw main body 2 are contained between the face 80*a* vertical from the front end 1*a* of the base 1 and the face 80*b* vertical from the rear end 1*b*. Therefore, the circular saw can be moved to positions at which the front end portion 1*a* and the rear end portion 1*b* of the base 1 are brought into contact with faces of walls and in side cutting, a remaining cut portion can be minimized. Although a distance L1 from the front end portion 1*a* of the base 1 to the saw blade 3 and a distance L2 from the rear end portion 1*b* to the saw blade 3 constitute remaining cut portions as shown in FIG. 31, in comparison with the background art, the portions can be made to be extremely small.

What is claimed is:

1. A portable cutting tool comprising:

a cutting tool main body having a saw blade for cutting a workpiece and a motor for driving to rotate the saw blade; and a base for guiding the cutting tool main body along a surface of the workpiece;

wherein an amount of the saw blade projected from a lower face of the base can be adjusted by pivoting the cutting tool main body relative to the base, wherein the base and the cutting tool main body are inclinably connected such that the saw blade can be projected from a vicinity of an intersection between a side face of the base and the lower face of the base, and a parallelism between the saw blade and the side face of the base is made to be able to be adjusted, wherein a support shaft constituting a fulcrum of the pivoting includes a first screw portion, a portion of the tool main body is formed with a second screw portion screwable to the first screw portion, and a torsional spring is disposed between the first screw portion and the second screw portion, and wherein the parallelism between a side face of the saw blade and the side face of the base is adiustable by pivoting the support shaft relative to the cutting tool main body.

2. The portable cutting tool according to claim 1, wherein the support shaft includes a head portion that is rotatably operable from the outside, and the head portion is positioned to be separated from the base when the base and the cutting tool main body are inclined such that the saw blade can be projected from the vicinity of the intersection between the side face of the base and the lower face of the base.

3. The portable cutting tool according to claim 1, wherein the base comprises first and second guide members for inclining the cutting tool main body relative to the base.

4. The portable cutting tool according to claim 3, wherein the first guide member comprises a circular arc shape disposed at a front end portion of the base.

5. The portable cutting tool according to claim 4, wherein the first guide member comprises a first guide hole comprising a circular arc shape penetrated in the first guide member in a radius direction.

6. The portable cutting tool according to claim 5, wherein an angular range of the first guide hole is set to less than 0°.

7. The portable cutting tool according to claim 3, wherein the second guide member comprises a circular arc shape disposed at a rear end portion of the base.

8. The portable cutting tool according to claim 7, wherein the second guide member comprises a second guide hole comprising a circular arc shape penetrated in the second guide member in a direction orthogonal to a radius direction of the circular arc shape.

9. The portable cutting tool according to claim 8, wherein an angular range of the second guide hole is set to less than 0°.

10. The portable cutting tool according to claim 1, wherein the amount of the saw blade projected from the lower face of the base extends in a direction away from the base.

11. A portable cutting tool comprising:

a saw blade for cutting a workpiece;

a cutting tool main body having a motor for driving to rotate the saw blade; and a base for guiding the cutting tool main body along a surface of the workpiece;

wherein an amount of the saw blade projected from a lower face of the base can be adjusted by pivoting the cutting tool main body relative to the base;

wherein a support shaft constituting a fulcrum of the pivoting includes a first screw portion, a portion of the tool main body is formed with a second screw portion screwable to the first screw portion, a parallelism between a side face of the saw blade and a side face of the base can be adjusted by pivoting the support shaft relative to the cutting tool main body; and wherein an outer periphery of the support shaft is provided with an urging member for urging to pivot the base and the cutting tool main body in a direction of separating the base and the cutting tool main body.

12. The portable cutting tool according to claim 11, wherein the base and the cutting tool main body are inclinably connected such that the saw blade can be projected from a vicinity of an intersection between the side face of the base and the lower face of the base.

* * * * *